Figure 1:
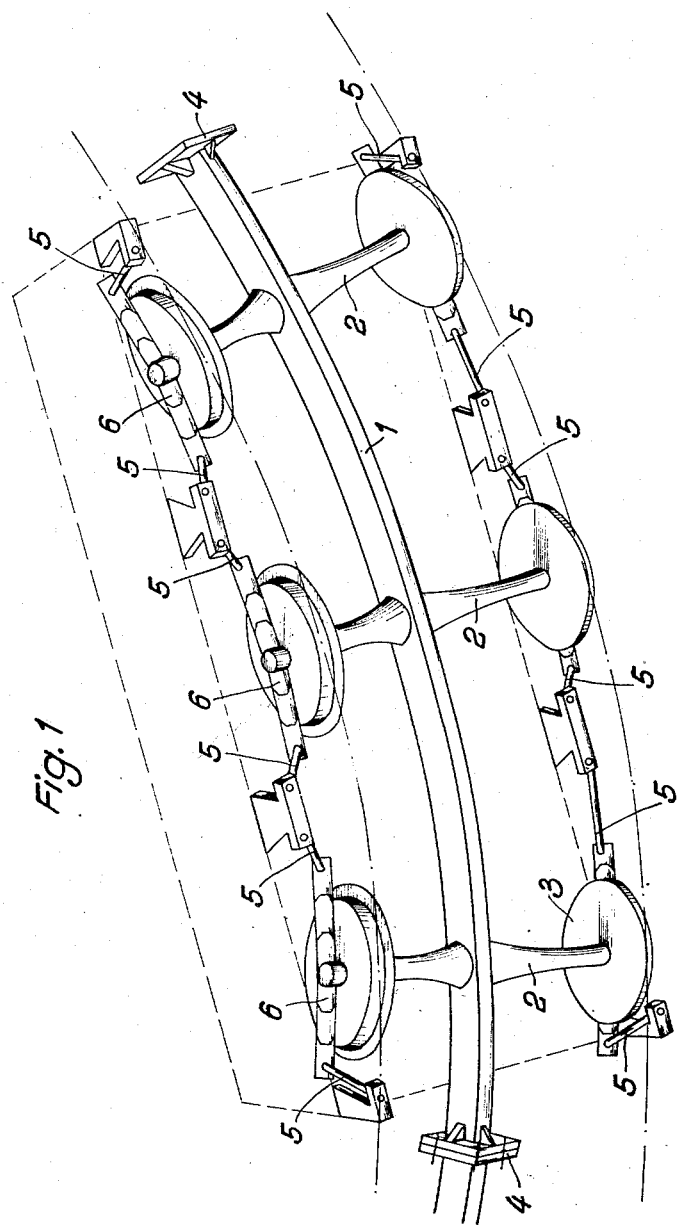

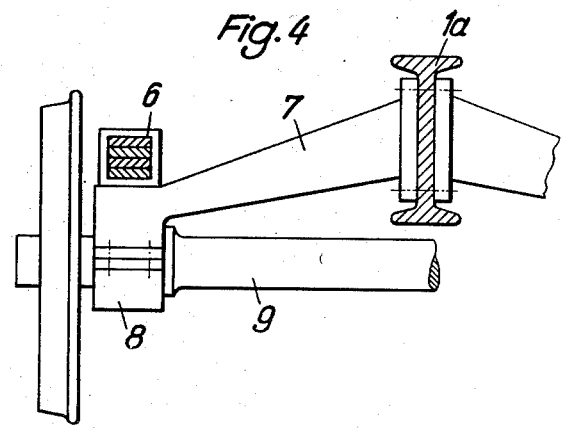
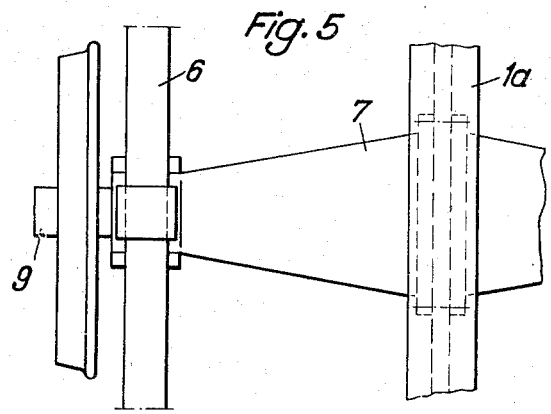
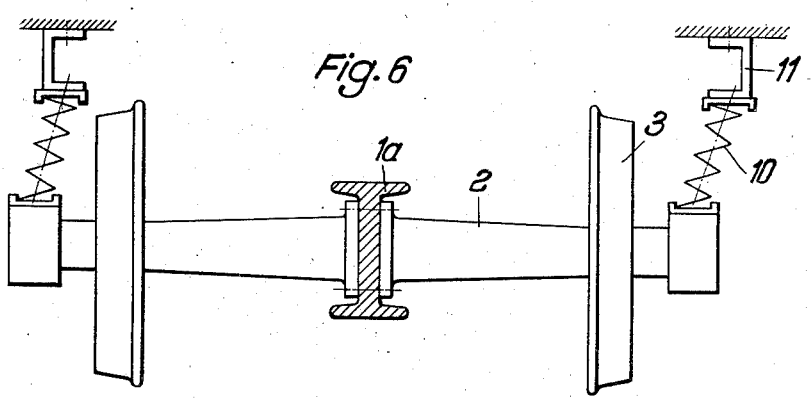

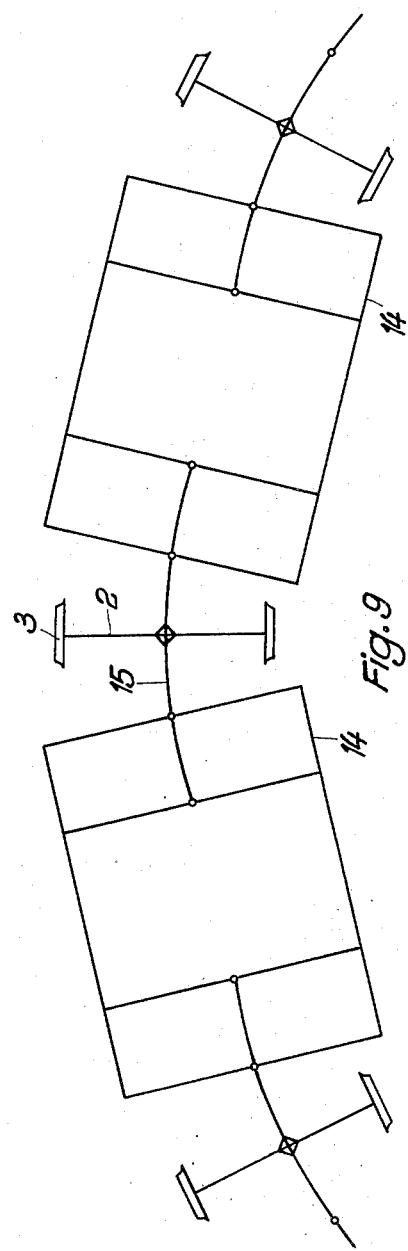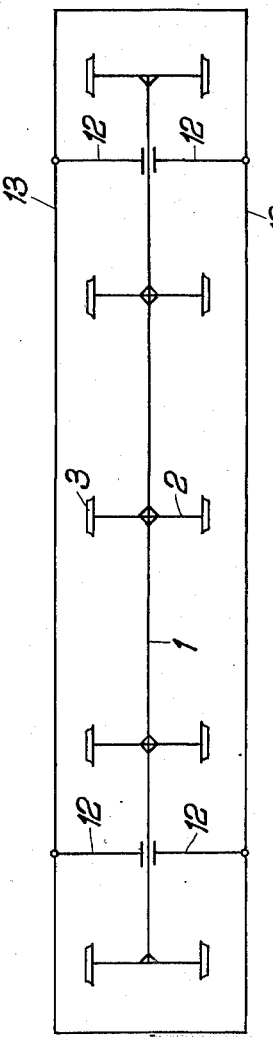

2,792,791
RUNNING GEAR FOR RAIL VEHICLES

Ernst Florian Kreissig, Krefeld-Uerdingen, Germany

Application October 18, 1955, Serial No. 541,173

Claims priority, application Germany April 8, 1952

7 Claims. (Cl. 105—416)

This application is a continuation-in-part of my co-pending application Serial No. 312,589, filed October 1, 1952, and now abandoned.

This invention relates to running gear for supporting the bodies of rail vehicles on a rail, and which gear can be used in all types of trains, but more especially in high-speed multiple-unit and passenger trains.

According to the invention, the running gear consists of a resilient longitudinal girder which is adapted to adjust itself to the curvature of the track and to which the axles are so connected as to resist bending. This longitudinal girder is thus capable of undergoing deformation in a horizontal plane in accordance with the track curves. It is not the function of the resilient longitudinal girder to take up and transmit the weights of the wagon bodies, but it is able to take up the tractive and braking forces arising. The weight of the wagon bodies is transmitted to the axles and wheels in known manner through spring suspensions or coil springs. The spring suspensions or the coil springs are adapted to take up the displacements of the axles in relation to the wagon body which result from the deformation of the resilient longitudinal girder.

It is to be understood that the term "axle" whenever used herein includes "half-axle."

In one embodiment of the invention, the resilient longitudinal girder extends under the whole train. In accordance with an alternative embodiment, it may be sub-divided into two parallel girders, one of which guides the wheels on the right-hand side of the vehicle, while the other guides the wheels on the left-hand side of the vehicle. In addition, in accordance with the invention, the moment of inertia of the longitudinal girder may vary in magnitude. More especially, it is advantageous for the moment of inertia to decrease in the direction of the ends of the girder so as to relieve the end axles of load.

If the motors, gearings or other structural parts extend into the space provided for the longitudinal girder, the girder may be replaced in the region concerned by a frame which is so connected to the adjacent longitudinal girders as to resist bending. The axles or half-axles may also be connected to the said frame.

The longitudinal girder may be composed of a number of sections rigidly connected together so as to resist bending. Finally, resilient carrier elements may, within the scope of the invention, be clamped between the ends of two adjacent wagon bodies.

Since the axles or half-axles are so secured to the resilient longitudinal girder as to resist bending, they normally adapt themselves to the curvature of the resilient girder when travelling along curved sections of the track and thus ensure that the striking angles of the wheels remain small.

In most cases, it will be expedient to employ loose wheels, that is to say, wheels rotatably mounted on the axles or half-axles. In such cases, the wheels offer only small resistance to the guiding action. On the other hand, if the wheels are fixedly mounted on the axle, they must be displaced with friction in the steering of this axle on the track, for which greater forces are necessary. Therefore, in order to ensure sufficient steering in cases where the wheels are fixedly mounted on the axle, the resilient longitudinal girder must be made stronger than when loose wheels are employed. If the wheels are rotatably mounted on the axle (loose wheels), the axle or half-axle is rigidly connected to the resilient longitudinal girder. When wheels fixedly mounted on the axle are employed, the axle is mounted in brackets, hollow axles or frames, rigidly connected to the resilient longitudinal girder.

The invention is based on the following theoretical considerations:

If the smallest radius of curvature of the track travelled on is designated by $R_1$, the smallest vertical radius of curvature (change of gradient) by $R_2$, the height of the girder by $h$, the width of the girder by $b$, the modulus of elasticity of the girder material by $E$ and the highest stress occurring in the girder by $\sigma$ then the following equations apply:

$$b = \frac{2 \cdot R_1 \cdot \sigma}{E}$$

and $$h = \frac{2 \cdot R_2 \cdot \sigma}{E}$$

According to these formulae, for example, when the maximum stress must not exceed 400 kg./cm.$^2$, the following are obtained for radii of curvature $R_1 = 250$ m. and $R_2 = 1000$ m.

$$b = \frac{2 \cdot 25000 \cdot 400}{2100000} = 9.5 \text{ cm.}$$

and $$h = \frac{2 \cdot 100000 \cdot 400}{2100000} = 38.1 \text{ cm.}$$

For a radius of 100 m., with the above girder dimensions, $\sigma$ is equal to 1600 kg./cm.$^2$. The dimensions may be varied in accordance with the foregoing formulae, depending upon the existing conditions of railway operation. If the dimensions of the resilient girder are reduced to such an extent that they are just sufficient for guiding the axles, the stresses in the girder due to the warping produced by the curves encountered are infinitely small. The smallest track curvatures occurring can also be negotiated in an entirely satisfactory manner. If the longitudinal girder is also to take up torsional moments, it is preferably constructed as a hollow girder.

Figure 2:
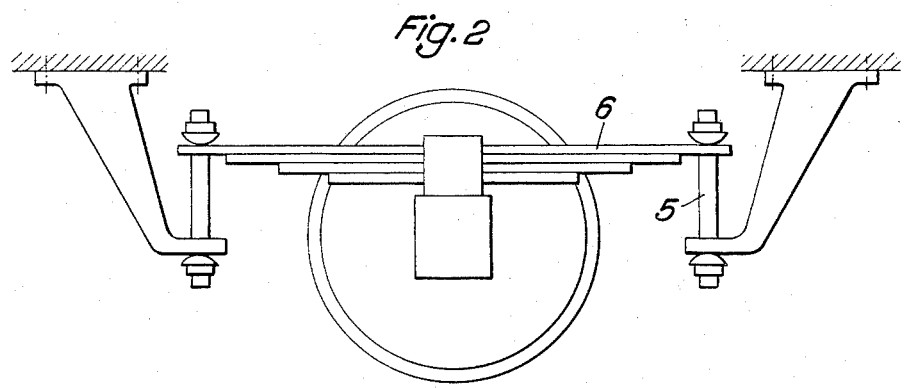
Figure 3:
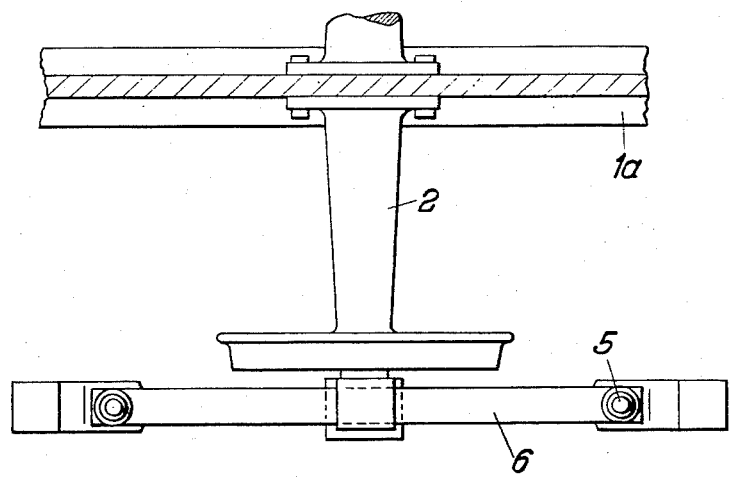
Figure 7:
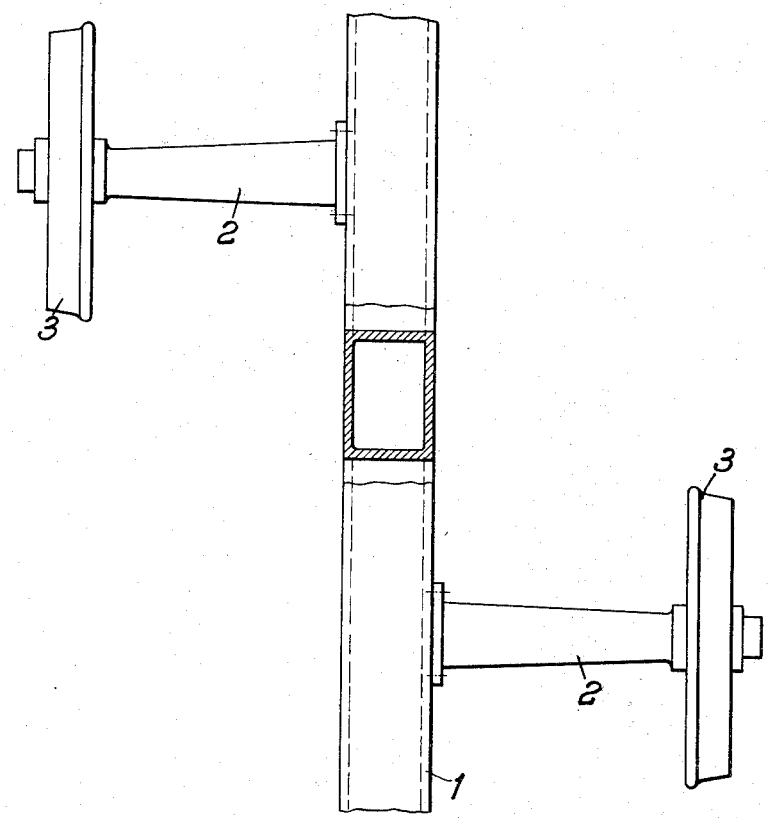

For a better understanding of the invention, reference will now be made to the accompanying drawings, in which:

Figure 1 is a diagrammatic view of the running gear on a curve, as seen from below, Figure 2 is a diagrammatic side elevation of an axle with a loose wheel, Figure 3 is a plan view corresponding to Figure 2, Figure 4 is a side elevation of part of an axle with fixed wheels, Figure 5 is a plan view corresponding to Figure 4, Figure 6 is a diagrammatic side elevation of an axle, on which the wagon body is mounted through the intermediary of coil springs, Figure 7 is a plan view showing a constructional form in which two half-axles connected to the resilient longitudinal girder are in staggered relationship, Figure 8 is a diagrammatic plan view of a vehicle in which guide rods are provided between the wagon body and the resilient longitudinal girder, and Figure 9 is a diagrammatic plan view of a train of wagons having resilient longitudinal girder elements provided between the wagon bodies.

As will be seen from Figure 1, the axles 2 carrying the loose wheels 3 are connected to the resilient longitudinal girder 1 in such manner as to resist bending. The resilient longitudinal girder 1 is constructed, for example, as a hollow girder and couplings 4 are welded or otherwise rigidly connected to the ends thereof, so that girders of like construction and performing the same function may be connected thereto to provide a girder unit having the same function and extending along the entire train. The weight of the wagon body bears through suspension means 5 and laminated springs 6 on the stubs of the half-axles 2 and consequently on the loose wheels 3. The running gear has been illustrated from below during travel along a curve in the track for a better understanding, the track being indicated by dash-dotted lines. Figure 1 shows that the wheel sets always adjust themselves perpendicularly to the tangent to the track by reason of the fact that the axles 2 are so connected to the resilient longitudinal girder 1 as to resist bending. The horizontal displacements of the axles in relation to the wagon body (shown in chain lines) which thus arise are taken up by the inclination of the suspension members 5.

In the constructional form illustrated in Figures 2 and 3, the resilient longitudinal girder 1a is an I-girder, to the web of which the two half-axles 2 are secured, for example by bolts. The wagon body bears on the half-axle 2 through suspension members 5 and laminated springs 6 as in Figure 1.

Figures 4 and 5 illustrate the connection of the resilient longitudinal girder to fixed axles, that is to say, to axles rigidly connected to the wheels. The resilient longitudinal girder is again an I-section in this case. Connected to the resilient longitudinal girder 1a in such manner as to resist bending are two brackets 7, which support divided axle bearings 8 at their ends. The laminated spring 6 is also secured to the said bearings 8. The fixed axle can readily be fitted and removed after removal of the lower shells of the bearings 8.

In the constructional form illustrated in Figure 6, coil springs 10 are provided, through which the wagon body bears on the half-axles 2. The deflection of the coil springs 10 results from the fact that the two half-axles 2 are situated with their loose wheels 3 on a curve, that is to say, the wagon body indicated by the channel sections 11 is laterally displaced in relation to the half-axle 2. Since the coil springs 10 are capable of performing both the vertical springing action and a horizontal springing action, the displacements between the wagon body and the axle during travel along a curve are readily taken up by such springs.

Figure 7 shows in plan a resilient longitudinal girder section corresponding to Figure 1, which is constructed as a hollow girder, but on which the half-axles 2 are arranged in staggered relationship. The half-axles 2 may again be secured by welding, screwing, or other means in such manner as to be resistant to bending at the point of connection. The hollow girder can readily take up the torsional stresses arising.

In Figure 8, five axles 2 having loose wheels 3 mounted thereon are so secured to the resilient longitudinal girder 1 as to resist bending. Disposed between each terminal axle and the axle adjacent thereto is a guide rod 12, which is secured to the wagon body 13. The said guide rods transmit the centrifugal force of the wagon body 13 to the longitudinal girder 1 during travel along a curve, so that the longitudinal girder 1 is additionally curved and the leading axles are accordingly set to a greater extent to a radial or over-radial position in relation to the track.

In the particular construction according to Figure 9, resilient longitudinal girder elements 15 are clamped between wagon bodies 14 and axles 2 resistant to bending are provided mid-way along the longitudinal girder elements 15. These axles 2 which have loose wheels 13 adjust themselves radially in the curve of the track. In this case the curvature of the resilient longitudinal girder elements 15 in the curve of the track is greater than that of the curved track section, that is to say, the radius of curvature of the resilient elements 15 is smaller than the radius of the curvature of the curve of the track. Since the resilient longitudinal girder elements 15 are consequently deflected to a greater extent and the frames 14 undergo no deflection corresponding to the curve of the track, the effect on the members 14 and 15 is the same as with a resilient girder extending along the entire length of the train as in Figure 1.

I claim:
1. Running gear for supporting the body of a rail vehicle on a rail track, the gear comprising a resilient longitudinal girder that has a springing action in a horizontal plane whereby it is adapted to adjust itself to the curvature of the track, axles rigidly connected to the girder so as to be resistant to bending, and wheels that co-operate with the track and are carried by the axles.

2. Running gear according to claim 1, wherein the moment of inertia of the resilient longitudinal girder decreases towards the ends of the vehicle body.

3. Running gear according to claim 1, wherein the resilient longitudinal girder consists of a number of units, and bend-resisting connections joining these units.

4. Running gear according to claim 1 and further comprising spring means that support the body on the axles and at the same time take up the lateral displacement of the resilient longitudinal girder in relation to the body.

5. Running gear according to claim 1, and further comprising bend-resisting couplings at each end of the resilient longitudinal girder for connection each to an adjacent resilient longitudinal girder of another similar gear.

6. Running gear according to claim 1, and further comprising guide rods disposed between each end axle and the adjacent axle of the gear, the guide rods being connected to the body and acting transversely on the girder thereby serving additionally to deflect the resilient longitudinal girder during travel along a curve.

7. Running gear according to claim 1 and further comprising frame-like structures that interrupt the girder along its length and are connected to the resilient longitudinal girder so as to be resistant to bending.

No references cited.